(12) United States Patent
Matsutani et al.

(10) Patent No.: US 10,207,323 B2
(45) Date of Patent: Feb. 19, 2019

(54) COMPOSITE MAGNETIC MATERIAL, COIL COMPONENT USING SAME, AND POWER SUPPLY DEVICE

(71) Applicant: Panasonic Intellectual Property Management Co., Ltd., Osaka (JP)

(72) Inventors: Nobuya Matsutani, Osaka (JP); Takeshi Takahashi, Kyoto (JP); Junichi Kotani, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 353 days.

(21) Appl. No.: 15/015,731

(22) Filed: Feb. 4, 2016

(65) Prior Publication Data

US 2016/0151836 A1    Jun. 2, 2016

Related U.S. Application Data

(63) Continuation of application No. PCT/JP2014/003986, filed on Jul. 30, 2014.

(30) Foreign Application Priority Data

Aug. 7, 2013  (JP) .................................. 2013-163879
Oct. 30, 2013 (JP) .................................. 2013-224937

(51) Int. Cl.
*B22F 1/00* (2006.01)
*H01F 1/24* (2006.01)
(Continued)

(52) U.S. Cl.
CPC .......... *B22F 1/0003* (2013.01); *B22F 1/0044* (2013.01); *B22F 1/02* (2013.01);
(Continued)

(58) Field of Classification Search
None
See application file for complete search history.

(56) References Cited

U.S. PATENT DOCUMENTS

| 7,422,697 B2 * | 9/2008 | Takahashi | H01F 1/33 252/62.55 |
| 8,758,906 B2 * | 6/2014 | Maeda | B22F 1/02 427/180 |

(Continued)

FOREIGN PATENT DOCUMENTS

| JP | 05-251224 | 9/1993 |
| JP | 06-267723 | 9/1994 |

(Continued)

OTHER PUBLICATIONS

International Search Report issued in Application No. PCT/JP2014/003986 dated Nov. 18, 2014, with English translation.

*Primary Examiner* — Kevin M Bernatz
(74) *Attorney, Agent, or Firm* — McDermott Will & Emery LLP

(57) ABSTRACT

A composite magnetic material includes a plurality of soft-magnetic metal powders, a first oxide that covers a surface of each of the plurality of soft-magnetic metal powders, and a second oxide that covers a surface of the first oxide and is interposed among the plurality of soft-magnetic metal powders each coated with the first oxide. The first oxide has a first recess in a surface, and the second oxide is provided in the first recess. With this configuration, peeling between the first oxide and the second oxide can be prevented, so that the composite magnetic material having high mechanical strength can be provided.

14 Claims, 11 Drawing Sheets

(51) Int. Cl.
  *B22F 1/02*    (2006.01)
  *H01F 1/33*    (2006.01)
  *H01F 27/255*  (2006.01)
  *C22C 38/02*   (2006.01)
  *C22C 38/06*   (2006.01)
  *H01F 1/147*   (2006.01)
  *H02M 11/00*   (2006.01)
  *C22C 38/00*   (2006.01)
  *B82Y 30/00*   (2011.01)

(52) U.S. Cl.
  CPC .............. *C22C 38/00* (2013.01); *C22C 38/02* (2013.01); *C22C 38/06* (2013.01); *H01F 1/14791* (2013.01); *H01F 1/24* (2013.01); *H01F 1/33* (2013.01); *H01F 27/255* (2013.01); *H02M 11/00* (2013.01); *B22F 2301/35* (2013.01); *B22F 2302/25* (2013.01); *B22F 2303/01* (2013.01); *B22F 2304/05* (2013.01); *B82Y 30/00* (2013.01); *C22C 2202/02* (2013.01)

(56) References Cited

U.S. PATENT DOCUMENTS

| | | |
|---|---|---|
| 2005/0072955 A1 | 4/2005 | Takahashi et al. |
| 2006/0159960 A1 | 7/2006 | Maeda et al. |
| 2011/0267167 A1* | 11/2011 | Ogawa .................. H01F 41/098 336/221 |
| 2013/0322135 A1* | 12/2013 | Kusawake ................ H01F 3/08 363/39 |
| 2014/0138570 A1* | 5/2014 | Otsuka ...................... H01F 1/24 252/62.55 |

FOREIGN PATENT DOCUMENTS

| | | |
|---|---|---|
| JP | 2005-113169 A | 4/2005 |
| JP | 2005-243794 A | 9/2005 |
| JP | 2006-024869 A | 1/2006 |
| JP | 2008-205152 A | 9/2008 |
| WO | 2005/083725 A1 | 9/2005 |

* cited by examiner

COMPOSITE MAGNETIC MATERIAL, COIL COMPONENT USING SAME, AND POWER SUPPLY DEVICE

This application is a continuation of International Application No. PCT/JP2014/003986 filed on Jul. 30, 2014, which claims the benefit of foreign priority of Japanese patent application 2013-163879, filed on Aug. 7, 2013, and Japanese patent application 2013-224937, filed on Oct. 31, 2013, the contents all of which are incorporated herein by reference.

BACKGROUND

1. Technical Field

The present disclosure relates to a composite magnetic material superior in magnetic characteristics and high in mechanical strength, a coil component using same, and a power supply device. Particularly, the present disclosure is useful for an inductor component used in a vehicle.

2. Description of the Related Art

According to conventional composite magnetic material 200 shown in FIG. 11, first oxide 22 (diffusion layer) is formed on a surface of soft-magnetic metal powder 21. Furthermore, second oxide 23 (ferrite material) is formed on a surface of first oxide 22 (diffusion layer), so that mechanical strength can be improved in composite magnetic material 200.

A related art literature includes Patent Literature 1.

CITATION LIST

Patent Literature

PTL 1: Unexamined Japanese Patent Publication No. 2005-113169, the contents of which are incorporated herein by reference.

SUMMARY

A composite magnetic material in an aspect of the present disclosure includes a plurality of soft-magnetic metal powders, a first oxide that covers a first surface of each of the plurality of soft-magnetic metal powders, and a second oxide that covers a surface of the first oxide and is interposed among the plurality of soft-magnetic metal powders each coated with the first oxide, in which the first oxide has includes a surface having a first recess, and the second oxide is provided in the first recess.

A composite magnetic material in another aspect of the present disclosure includes a plurality of soft-magnetic metal powders, and a first oxide interposed among the plurality of soft-magnetic metal powders, in which at least one element contained in the plurality of soft-magnetic metal powders is a first element, at least one element contained in the first oxide is the first element, and the first element is one of Al, Cr, Ti, Mg, Ni, Si and Ca.

According to the composite magnetic material in the present disclosure, since the second oxide is filled in the recess formed in the surface of the first oxide, a large adhesion area can be provided between the first oxide and the second oxide, and peeling between the first oxide and the second oxide can be suppressed, so that the composite magnetic material can be high in mechanical strength.

Furthermore, according to the composite magnetic material in the present disclosure, the element is contained in common in each of soft-magnetic metal powders 1, first oxide, and second oxide, so that the magnetic characteristics can be prevented from deteriorating.

DETAILED DESCRIPTION OF THE PREFERRED EMBODIMENTS

Before this exemplary embodiment is described, a conventional problem will be described. A conventional composite magnetic material does not have sufficient mechanical strength. Especially, as for a coil component which is used in a vehicle, improvement in mechanical strength (reliability) is especially required.

Hereinafter, the composite magnetic material in the present disclosure will be described.

First Exemplary Embodiment

The first exemplary embodiment will be described with reference to FIGS. 1 to 6.

Figure 1:
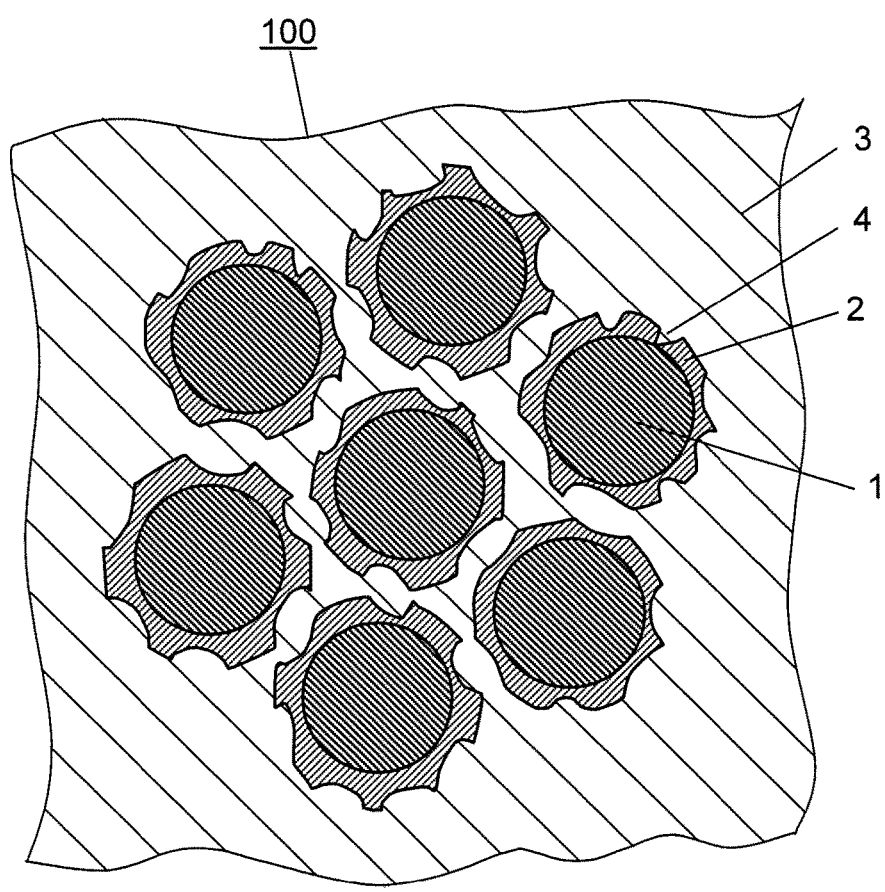
FIG. 1 is a schematic view showing a cross-sectional surface of a composite magnetic material in a first exemplary embodiment.

FIG. 1 is a schematic view showing a cross-sectional surface of a composite magnetic material in the first exemplary embodiment. As shown in FIG. 1, composite magnetic material 100 in the present disclosure includes plurality of soft-magnetic metal powders 1, first oxide 2 which covers a surface of each of soft-magnetic metal powders 1, and second oxide 3 which covers a surface of first oxide 2 and is interposed among soft-magnetic metal powders 1 each covered with first oxide 2. Furthermore, first oxide 2 has first recesses 4 around its surface, and second oxide 3 is provided in first recesses 4.

With this configuration, composite magnetic material 100 in this exemplary embodiment has high mechanical strength (high reliability) required when it is used in a vehicle, especially. More specifically, compared with conventional composite magnetic material 200 described with reference to FIG. 11 in which first oxide 22 (diffusion layer) is formed on the surface of soft-magnetic metal powder 21, and second oxide 23 (ferrite material) is formed around first oxide 22, composite magnetic material 100 in this exemplary embodiment is large in adhesion area between first oxide 2 and second oxide 3. Thus, the mechanical strength can be improved in composite magnetic material 100.

Furthermore, according to composite magnetic material 100 in the first exemplary embodiment, first oxide 2 which contributes to magnetic characteristics is composed of ferrite material, and second oxide 3 is also composed of ferrite material (material having magnetic characteristics), so that plurality of soft-magnetic metal powders 1 are electrically insulated, and higher magnetic characteristics can be obtained.

Furthermore, the same is true for composite magnetic material 100 in another exemplary embodiment which will be described below.

According to composite magnetic material 100 in the first exemplary embodiment, first oxide 2 exists between each of soft-magnetic metal powder 1. Thus, an element contained in soft-magnetic metal powders 1 and an element contained in first oxide 2 are selected from Al, Cr, Ti, Mg, Ni, Si, and Ca. That is, at least one element contained in soft-magnetic metal powders 1, at least one element contained in first oxide 2, and at least one element contained in second oxide 3 are the same element (first element).

That is, when the element is contained in common in soft-magnetic metal powders 1, first oxide 2, and second oxide 3, element diffusion is suppressed between soft-magnetic metal powder 1 and first oxide 2 formed on the surface of soft-magnetic metal powder, so that composition deviation can be prevented between them, and the magnetic characteristics can be prevented from deteriorating.

Variation of First Exemplary Embodiment

Figure 2:
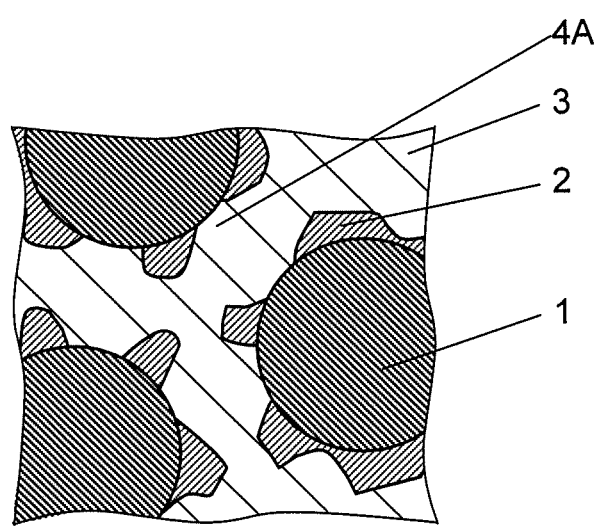
FIG. 2 is a schematic view showing a cross-sectional view of a composite magnetic material in a variation of the first exemplary embodiment.

FIG. 2 shows composite magnetic material 100 in the variation of the first exemplary embodiment in the present disclosure.

As shown in FIG. 2, first recess 4A penetrates first oxide 2 so that a surface of soft-magnetic metal powder 1 is exposed, and the surface of soft-magnetic metal powder 1 is partially in contact with second oxide 3. In this variation also, similar to the first exemplary embodiment, a large adhesion area can be provided between first oxide 2 and second oxide 3, and high mechanical strength can be obtained. According to this variation, second oxide 3 composed of ferrite material is interposed among adjacent soft-magnetic metal powders 1, so that a gap which blocks a magnetic flux is not formed, and high magnetic characteristics can be realized.

Furthermore, as for the other exemplary embodiment to be described below, similar to this exemplary embodiment, the surface of soft-magnetic metal powder 1 may be partially in contact with second oxide 3.

Furthermore, an area ratio A/B is favorably between 0.25 and 4, where A represents a contact area between first oxide 2 and soft-magnetic metal powder 1, and B represents a contact area between second oxide 3 and soft-magnetic metal powder 1.

First oxide 2 is formed when the element contained in soft-magnetic metal powder 1 is diffused on the surface of soft-magnetic metal powder 1, so that soft-magnetic metal powder 1 and first oxide 2 are an almost integrated body, and first oxide 2 and soft-magnetic metal powder 1 are highly adhered to each other. A main cause of reduction in mechanical strength of composite magnetic material 100 depends on adhesion force between second oxide 3 and soft-magnetic metal powder 1, or adhesion force between second oxide 3 and first oxide 2. Thus, when the area ratio A/B is 0.25 or more, composite magnetic material 100 can ensure sufficient mechanical strength. In addition, when the area ratio A/B is 4 or less, there is no gap which blocks the magnetic flux, and the high magnetic characteristics can be realized.

Furthermore, the contact area between first oxide 2 and soft-magnetic metal powder 1, and the contact area between second oxide 3 and soft-magnetic metal powder 1 can be found by measuring an upper surface provided when composite magnetic material 100 is cut at a certain cross-sectional surface by Auger electron spectroscopy (AES).

Figure 3:
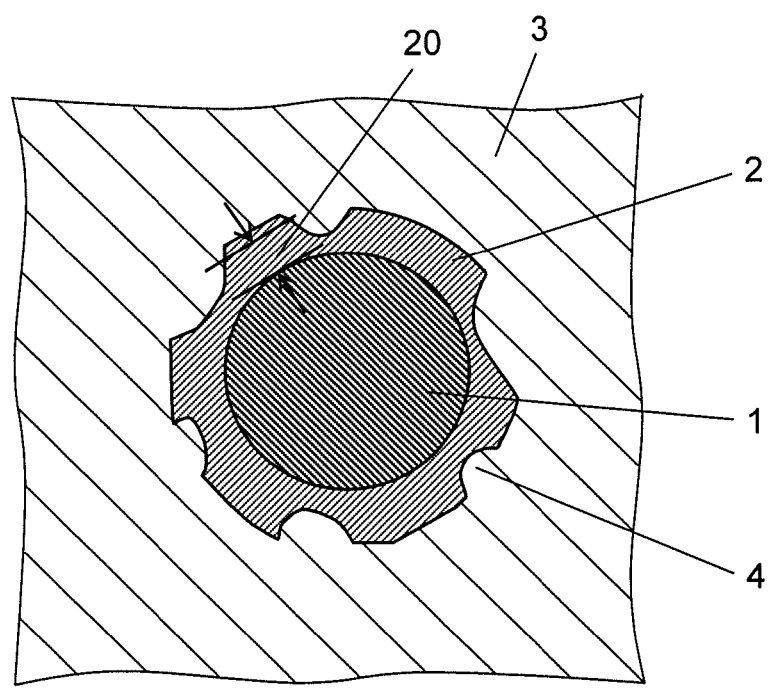
FIG. 3 is a partially enlarged view of the schematic view of the composite magnetic material shown in FIG. 1.

Furthermore, as shown in FIG. 3, average thickness 20 of first oxide 2 from the surface of soft-magnetic metal powder 1 favorably falls in a range from 5 nm and 500 nm inclusive. When it is 5 nm or more, an overcurrent loss can be sufficiently prevented from being generated due to a contact between soft-magnetic metal powders 1, and when it is 500 nm or less, a total amount of soft-magnetic metal powders 1 and second oxide 3 to contribute the magnetic characteristics can be ensured, so that the magnetic characteristics can be sufficiently ensured.

Furthermore, average thickness 20 of first oxide 2 can be found by analyzing the common element on an upper surface provided when composite magnetic material 100 is cut at a certain cross-sectional surface with an X-ray micro analyzer (XMA) to recognize the presence or absence of first oxide 2.

Furthermore, in composite magnetic material 100 in this exemplary embodiment, the element contained in common in each of soft-magnetic metal powders 1, first oxide 2, and second oxide 3 is referred to as a first element. Here, it is favorable that a relationship of L<N<M is satisfied, where L represents a concentration of the first element in soft-magnetic metal powder 1, M represents a concentration of the first element in first oxide 2, and N represents a concentration of the first element in second oxide 3.

For example, in a case where soft-magnetic metal powder 1 is Fe—Si—Al based alloy, first oxide 2 is $Al_2O_3$, and second oxide 3 is $FeAl_2O_4$, the common element (first element) is Al. As for Al concentrations, $Al_2O_3$ of first oxide 2 is highest, $FeAl_2O_4$ of second oxide 3 is middle, and Fe—Si—Al based alloy of soft-magnetic metal powder 1 is lowest.

Furthermore, the concentration of the common element (first element) favorably has a gradient distribution in a vertical direction in a layer close to an interface between soft-magnetic metal powder 1 and first oxide 2, and the concentration of the common element (first element) favorably has a gradient distribution in a vertical direction in a layer close to an interface between first oxide 2 and second oxide 3. When the concentration of the common element has the gradient distribution, a constituent is diffused in each of the interface (or the layer near the interface) between soft-magnetic metal powder 1 and first oxide 2, and the interface (or the layer near the interface) between first oxide 2 and second oxide 3. That is, the common element (first element) has the gradient distribution in the layer near the interface. This gradient distribution serves as an index of integrity of the different materials, and peeling possibility and adhesiveness between the different materials.

Soft-magnetic metal powders 1 in composite magnetic material 100 in this exemplary embodiment include alloy powders and amorphous alloy powders containing Fe and at least one element selected from Al, Cr, Ti, Mg, Ni, Si, and Ca, and metal glass powders. An average diameter of soft-magnetic metal powder 1 is favorably between 1 μm and 100 μm. When the average diameter of soft-magnetic metal powders 1 is 1 μm or more, soft-magnetic metal powders are not aggregated, so that soft-magnetic metal powder 1 can serve as one independent particle at the time of being mixed or diffused with another material. Furthermore, when the average diameter of soft-magnetic metal powder 1 is 100 μm or less, an overcurrent loss can be prevented from being generated due to contacts between soft-magnetic metal powders 1. More favorably, the average diameter of soft-magnetic metal powder 1 is between 3 μm and 60 μm to provide more prominent effect.

First oxide 2 in composite magnetic material 100 in this exemplary embodiment contains oxygen and an element selected from Al, Cr, Ti, Mg, Ni, Si, and Ca, such as $Al_2O_3$, $Cr_2O_3$, TiO, MgO, NiO, $SiO_2$, and CaO when the above element is Al, Cr, Ti, Mg, Ni, Si, and Ca, respectively. First oxide 2 can be composed of a desired element and oxygen, depending on a kind and a mixed amount of a raw material.

Furthermore, first oxide 2 may be a composite oxide containing another element which is contained in soft-magnetic metal powder 1 in addition to the above oxide. Furthermore, first oxide 2 in this exemplary embodiment only needs to sufficiently insulate soft-magnetic metal powders 1, so that a constituent of first oxide 2 is not limited.

Second oxide 3 in composite magnetic material 100 in this exemplary embodiment may be various kinds of ferrite materials, and representative materials include Mn—Ni series, Ni—Zn series, Mg—Zn series, and a magnetic sintered spinel structure body provided by mixing various elements to hercynite expressed by a chemical formula of $FeAl_2O_4$.

In addition, soft-magnetic metal powder 1 in composite magnetic material 100 in this exemplary embodiment may be a Fe-containing magnetic metal, and another element. Here, the Fe-containing magnetic metal includes Fe metal, Fe—Si based alloy, Fe—Si—Al based alloy, and Fe—Ni based alloy.

Furthermore, the other element specifically includes Al, Cr, Ti, Mg, Ni, Si, and Ca. When the Fe metal, Fe—Si based alloy, and Fe—Si—Al based alloy are selected as the Fe-containing magnetic metal, the other element can be selected from Al, Cr, Ti, Mg, Ni, Si, and Ca, and a concentration of the other element in a surface layer of soft-magnetic metal powder 1 is favorably between 0.5 wt % and 10 wt % when a total amount of soft-magnetic metal powders 1 is 100 wt %. When the concentration of this other element is 0.5 wt % or more, first oxide 2 can be uniformly distributed in the surface layer of soft-magnetic metal powder 1 when soft-magnetic metal powder 1 is subjected to a heat treatment, and as a result, first oxide which is produced through the heat treatment for soft-magnetic metal powder 1 can be uniformly formed on the surface of soft-magnetic metal powder 1. Furthermore, when the concentration is 10 wt % or less, high magnetic characteristics can be realized.

In addition, when the Fe—Ni based alloy is selected as the Fe-containing magnetic metal, unlike the above, there is no limitation on the concentration of the other element in the surface layer of soft-magnetic metal powder 1.

The above description is not only applied to the first exemplary embodiment, but also applied to the other exemplary embodiment to be described below.

<Structure of Coil Component 8>

A coil component using composite magnetic material 100 in this exemplary embodiment will be described with reference to FIG. 4.

Figure 4:
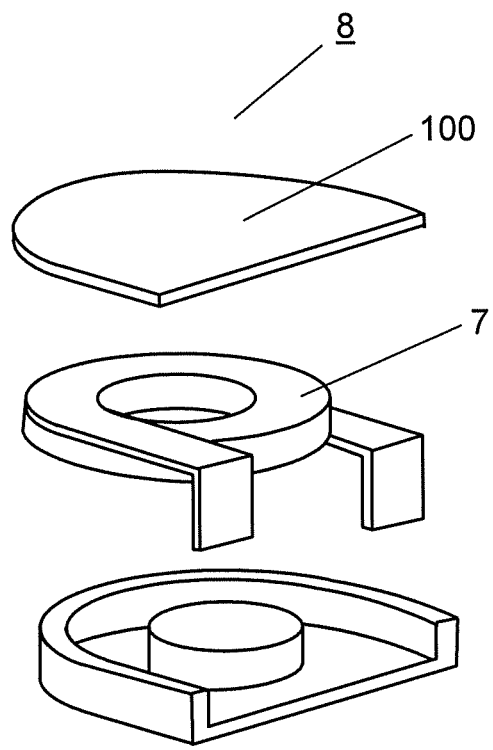
FIG. 4 is an exploded perspective view of a coil component in the first exemplary embodiment.

FIG. 4 is an exploded perspective view of coil component 8. Coil component 8 is provided by combining composite magnetic material 100 and wound coil 7, and coil component 8 has high mechanical strength because composite magnetic material 100 is used.

Furthermore, coil component 8 may use composite magnetic material 100 in the other exemplary embodiment to be described below instead of that in the first exemplary embodiment.

<Structure of Power Supply Device 11>

A power supply device in this exemplary embodiment will be described with reference to FIG. 5.

Figure 5:
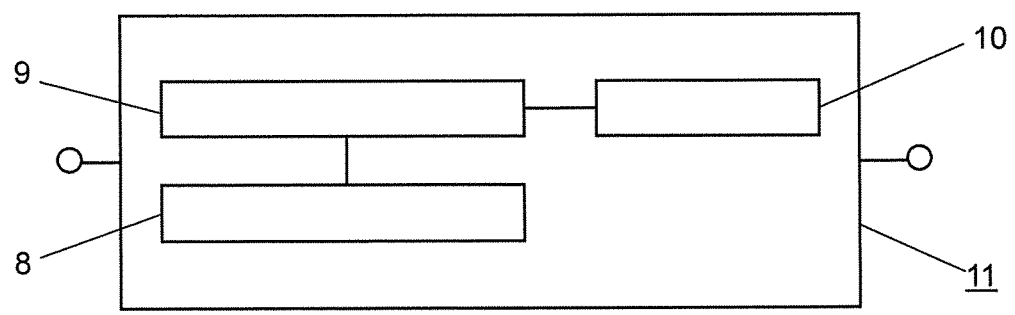
FIG. 5 is a block diagram of a power supply device in the first exemplary embodiment.

FIG. 5 shows a circuit diagram of power supply device 11 in this exemplary embodiment, and power supply device 11 includes switching element 9, drive circuit 10 for controlling a switching operation of switching element 9, and coil component 8 connected to switching element 9. Since power supply device 11 includes coil component 8 in this exemplary embodiment, high reliability can be realized because coil component 8 has high mechanical strength.

Furthermore, coil component 8 in power supply device 11 may use composite magnetic material 100 in the other exemplary embodiment to be described below instead of that in the first exemplary embodiment.

<Method for Manufacturing Composite Magnetic Material 100>

Hereinafter, the method for manufacturing composite magnetic material 100 in this exemplary embodiment will be described.

In addition, the manufacturing method to be described below is just one example, and the method for manufacturing composite magnetic material 100 in this exemplary embodiment is not limited to this.

Figure 6:
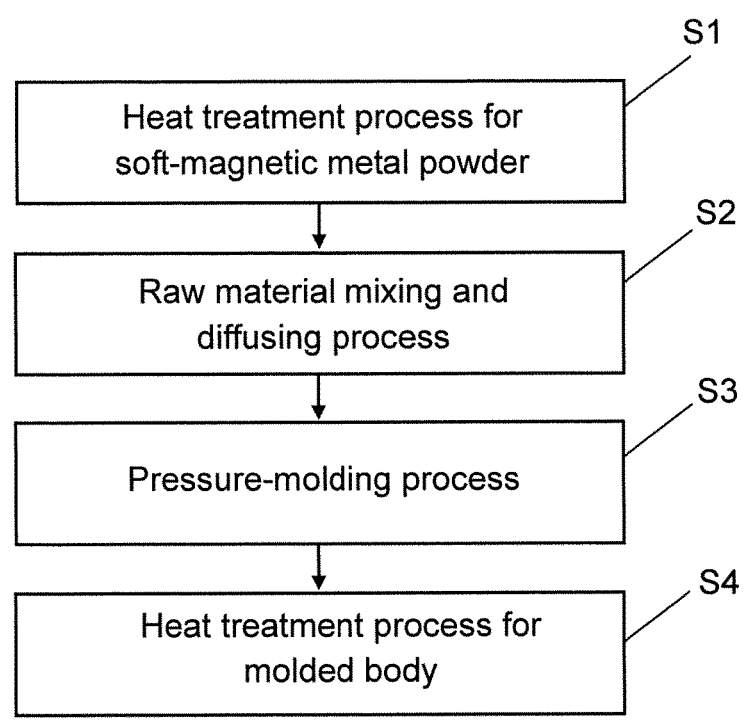
FIG. 6 is a flowchart showing a method for manufacturing the composite magnetic material in the first exemplary embodiment.

FIG. 6 is a flowchart showing the method for manufacturing composite magnetic material 100 in the first exemplary embodiment. Soft-magnetic metal powders 1 used in composite magnetic material 100 in this exemplary embodiment are prepared as Fe—Si—Al alloy powders by a gas-atomizing method. The alloy powders contain 10.0 wt % Si, 5.0 wt % Al, and the balance Fe. This alloy powder has an average grain diameter of 27 μm.

In a heat treatment step (step S1) for soft-magnetic metal powders 1, soft-magnetic metal powders 1 are subjected to a heat treatment at 1000° C. for two hours in an air atmosphere, whereby $Al_2O_3$ (first oxide 2) having a thickness of 0.1 μm is formed on the surface of soft-magnetic metal powder 1.

Subsequently, in a raw material mixing and diffusing step (step S2), 7.2 wt % of $Fe_2O_3$ powders, 9.5 wt % of $Al_2O_3$ powders, and 3.3 wt % of MnO powders to magnetize the powders are added in 100 wt % of soft-magnetic metal powders 1 each having the surface coated with first oxide 2. These are mixed and diffused, and then a silicone resin and an organic solvent are mixed and diffused in a rotary ball mill, whereby mixed powders are obtained.

Subsequently, in a pressure-molding step (step S3), the mixed powders obtained in step 2 are pressure-molded at 7 ton/$cm^2$, whereby a molded body having a predetermined shape is formed.

Furthermore, in a heat treatment step (step S4) for the molded body, the molded body obtained in step S3 is subjected to a heat treatment at 800° C. for six hours in a strong reducing atmosphere of nitrogen-0.5 vol % hydrogen. As a result, composite magnetic material 100 in this exemplary embodiment is manufactured in which soft-magnetic metal powders 1 are Fe—Si—Al based alloy powders, first oxide 2 is $Al_2O_3$, and second oxide 3 is $FeAl_2O_4$.

Soft-magnetic metal powders 1 are insulated with first oxide 2 and second oxide 3 so as not to come in contact with each other. Meanwhile, unlike soft-magnetic metal powders 1, each of first oxide 2 and second oxide 3 is a sintered material. Second oxide 3 of ferrite needs to be sufficiently sintered.

In addition, under the heat treatment condition in step S4, $Fe_2O_3$ and $Al_2O_3$ are combined, and $FeAl_2O_4$ is produced. At this time, $Al_2O_3$ (first oxide 2) formed on the surface of soft-magnetic metal powder 1 is partially decomposed, and the Al element in the decomposed $Al_2O_3$ is taken into $FeAl_2O_4$. As a result, as shown in FIG. 1, first recess 4 is formed in the surface of first oxide 2.

Furthermore, since the mixed amounts of the $Fe_2O_3$ powders and $Al_2O_3$ powders are to be selected and adjusted depending on the kind and an amount of second oxide 3 to be formed, they are not limited to the above mixed amount.

In order to obtain stable $FeAl_2O_4$ which is close to a stoichiometric composition, the mixed amount of the starting material is to be previously adjusted after due consideration of the decomposition of $Al_2O_3$ (first oxide 2) formed on the surface of soft-magnetic metal powder 1. Furthermore, a size of first recess 4 formed in the surface of first oxide 2 can be adjusted by adjusting the temperature and the time of the heat treatment. That is, when the mixed amount of the $Al_2O_3$ powders is less than that of the $Fe_2O_3$ powders to be mixed as the starting powders in order to obtain stable $FeAl_2O_4$, $Fe_2O_3$ is combined with $Al_2O_3$ (first oxide 2), and as a result, large first recess 4 is formed in the surface of first oxide 2.

Furthermore, the $Fe_2O_3$ powders and the $Al_2O_3$ powders are used as the starting materials to form second oxide 3 in this exemplary embodiment, but the method for manufacturing composite magnetic material 100 in this exemplary embodiment is not limited to this. For example, oxides to form second oxide 3 may be previously mixed and ground to be used.

Second Exemplary Embodiment

Hereinafter, the second exemplary embodiment will be described with reference to FIGS. 7 to 10.

Figure 7:
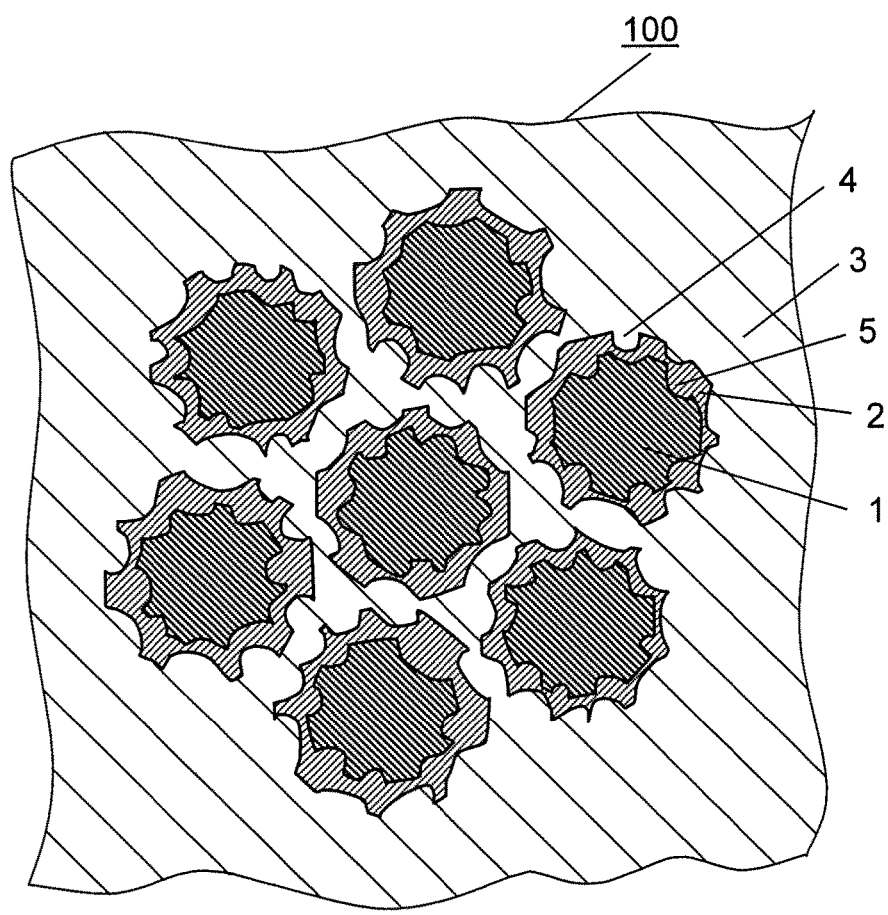
FIG. 7 is a schematic view showing a cross-sectional surface of a composite magnetic material in a second exemplary embodiment.
Figure 8:
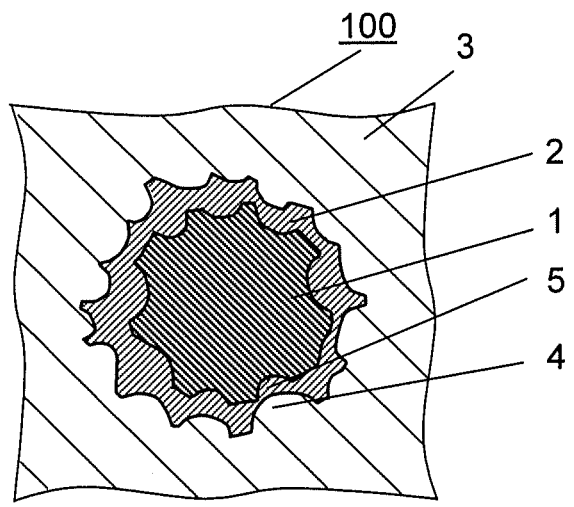
FIG. 8 is a partially enlarged view of the schematic view of the composite magnetic material shown in FIG. 7.

FIG. 7 is a schematic view of a cross-sectional surface of composite magnetic material 100 in the second exemplary embodiment. FIG. 8 is a partially enlarged view of the schematic view of composite magnetic material 100 shown in FIG. 7.

Furthermore, in the description in this exemplary embodiment, the same component as in the first exemplary embodiment is marked with the same reference and its description is omitted.

A configuration of composite magnetic material 100 in the second exemplary embodiment shown in FIG. 7 differs from the configuration of composite magnetic material 100 in the first exemplary embodiment shown in FIG. 1 in that soft-magnetic metal powder 1 has second recesses 5 in its surface.

In the second exemplary embodiment also, similar to the first exemplary embodiment, high mechanical strength which is required in vehicle use especially can be realized.

Figure 11:
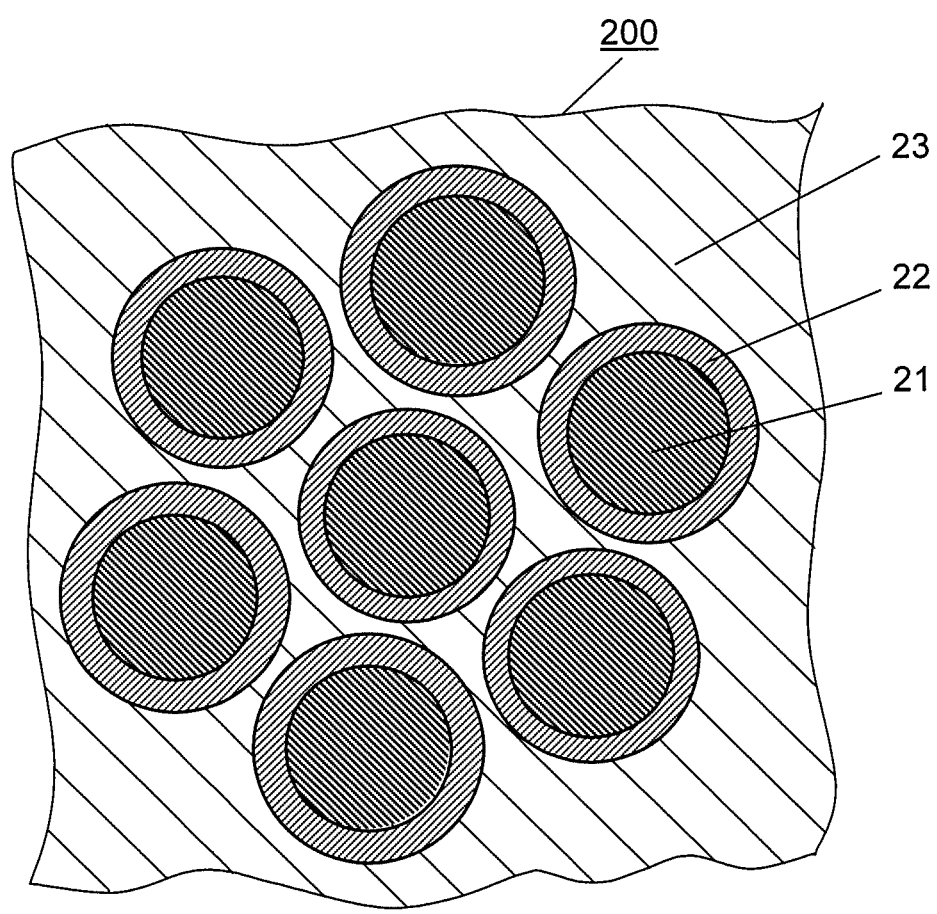
FIG. 11 is a schematic view showing a cross-sectional surface of a conventional composite magnetic material.

That is, compared with conventional composite magnetic material 200 shown in FIG. 11, according to composite magnetic material 100 in this exemplary embodiment, an adhesion area is large between soft-magnetic metal powder 1 and first oxide 2, and an adhesion area is large between first oxide 2 and second oxide 3, so that the mechanical strength of composite magnetic material 100 can be improved.

In composite magnetic material 100 in the second exemplary embodiment, second oxide 3 is interposed among soft-magnetic metal powders 1 each covered with first oxide 2, and second oxide 3 contains at least one element selected from Al, Cr, Ti, Mg, Ni, Si and Ca. In this configuration, in a heat treatment step for a molded body which will be described below, at least one element of Al, Cr, Ti, Mg, Ni, Si, and Ca is diffused and an oxide is formed on a surface of each of soft-magnetic metal powders 1. The oxide serves as first oxide 2 provided in second recess 5.

Furthermore, an average thickness of first oxide 2 from the surface of soft-magnetic metal powder 1 is favorably 500 nm or less. When it is 500 nm or less, a gap which blocks a magnetic flux can be small, so that sufficient magnetic characteristics can be ensured. This average thickness of first oxide 2 is favorably between 5 nm and 500 nm.

Furthermore, similar to the first exemplary embodiment, the average thickness of first oxide 2 can be found by analyzing the element on an upper surface provided when composite magnetic material 100 is cut at a certain cross-sectional surface with an X-ray micro analyzer (XMA) to recognize the presence or absence of first oxide 2.

Furthermore, a concentration of a first element contained in common in each of soft-magnetic metal powders 1, first oxide 2, and second oxide 3 is similar to that in the first exemplary embodiment, so that a description for it is omitted here.

Furthermore, the concentration of the common element has a gradient distribution in each of an interface between soft-magnetic metal powder 1 and first oxide 2, and an interface between first oxide 2 and second oxide 3, which is similar to the first exemplary embodiment, so that a description for it is omitted here.

Furthermore, similar to the first exemplary embodiment, since second oxide 3 is composed of ferrite material having magnetic characteristics, respective soft-magnetic metal powders 1 are insulated from each other, and higher magnetic characteristics can be obtained.

Soft-magnetic metal powders 1 in composite magnetic material 100 in this exemplary embodiment include alloy powders and amorphous alloy powders containing Fe and at least one element selected from Al, Cr, Ti, Mg, Ni, Si, and Ca, and metal glass powders. An average diameter of soft-magnetic metal powder 1 is favorably between 1 μm and 100 μm. When the average diameter of soft-magnetic metal powder 1 is 1 μm or more, soft-magnetic metal powders are not aggregated, so that soft-magnetic metal powder 1 can serve as one independent particle at the time of being mixed or diffused with another material. Furthermore, when the average diameter of soft-magnetic metal powder 1 is 100 μm or less, an overcurrent loss can be prevented from being generated. More favorably, the average diameter of soft-magnetic metal powder 1 is between 3 μm and 50 μm to provide more prominent effect.

According to composite magnetic material 100 in this exemplary embodiment, similar to the first exemplary embodiment, first oxide 2 contains oxygen and an element selected from Al, Cr, Ti, Mg, Ni, Si, and Ca. First oxide 2 can be composed of a desired element and oxygen, depending on a kind and a mixed amount of a raw material.

Second oxide 3 in composite magnetic material 100 in this exemplary embodiment may be various kinds of ferrite materials. Representative materials include Mn—Zn series, Ni—Zn series, Mg—Zn series, and a magnetic sintered spinel structure body provided by mixing various elements to hercynite.

Furthermore, composite magnetic material 100 in this exemplary embodiment may be used in coil component 8 which has been described with reference to FIG. 4.

An effect and the like are similar to the first exemplary embodiment, so that a description for them is omitted here.

Furthermore, composite magnetic material 100 in this exemplary embodiment may be used in power supply device 11 having coil component 8 which has been described with reference to FIG. 5. Even when composite magnetic material 100 in the second exemplary embodiment is used, there is provided an effect similar to composite magnetic material 100 in the first exemplary embodiment.

<Method for Manufacturing Composite Magnetic Material 100>

Hereinafter, the method for manufacturing composite magnetic material 100 in this exemplary embodiment will be described.

In addition, the manufacturing method to be described below is just one example, and the method for manufacturing composite magnetic material 100 in the present disclosure is not limited to this.

Furthermore, a flowchart showing the manufacturing method in this exemplary embodiment is similar to that in FIG. 6. Therefore, the manufacturing method in this exemplary embodiment will be described with reference to FIG. 6.

FIG. 6 is a flowchart showing the method for manufacturing composite magnetic material 100 in the present disclosure. First, soft-magnetic metal powders 1 used in composite magnetic material 100 in this exemplary embodiment are prepared as Fe—Si—Al alloy powders by gas-atomizing method. The alloy powders contain 10.0 wt % Si, 5.0 wt % Al, and the balance Fe. This alloy powder has an average diameter of 30 μm.

In addition, the method for preparing the soft-magnetic metal powders may be a grinding method or a water-atomizing method other than the gas-atomizing method. Soft-magnetic metal powder 1 has various surface shapes depending on its preparing method and its composition.

In a heat treatment step (step S1) for soft-magnetic metal powders 1, soft-magnetic metal powders 1 are subjected to a heat treatment at 800° C. for two hours in an air atmosphere, whereby $Al_2O_3$ (first oxide 2) having a thickness of 0.1 μm is formed on the surface of soft-magnetic metal powder 1.

Subsequently, in a raw material mixing and diffusing step (step S2), 10 wt % of $Fe_2O_3$ powders and 12.5 wt % of $Al_2O_3$ powders are added in 100 wt % of soft-magnetic metal powders 1 each having the surface coated with first oxide 2. These are mixed and diffused, and then an acrylic resin and an organic solvent are mixed and diffused in a rotary ball mill, whereby mixed powders are obtained.

Subsequently, in a pressure-molding step (step S3), the mixed powders are pressure-molded at 8 ton/cm², whereby a molded body having a predetermined shape is formed.

Furthermore, in a heat treatment step (step S4) for the molded body, the molded body obtained in step S3 is subjected to a heat treatment at 1000° C. for five hours in a strong reducing atmosphere of nitrogen-1 vol % hydrogen. As a result, composite magnetic material 100 in this exemplary embodiment is manufactured in which soft-magnetic metal powders 1 are Fe—Si—Al alloy powders, first oxide 2 is $Al_2O_3$, and second oxide 3 is $FeAl_2O_4$.

Soft-magnetic metal powders 1 are insulated with first oxide 2 and second oxide 3 so as not to come in contact with each other. Second oxide 3 of ferrite needs to be sufficiently sintered.

In addition, under the heat treatment condition in step S4, $Fe_2O_3$ and $Al_2O_3$ are combined, and $FeAl_2O_4$ is produced. At this time, $Al_2O_3$ (first oxide 2) formed on the surface of soft-magnetic metal powder 1 partially reacts with $Fe_2O_3$, and $FeAl_2O_4$ is produced. As a result, first recess 4 is formed in the surface of first oxide 2 in this exemplary embodiment.

Furthermore, the mixed amounts of the $Fe_2O_3$ powders and $Al_2O_3$ powders can be appropriately adjusted depending on an amount of second oxide 3 to be formed. In order to obtain stable $FeAl_2O_4$ which is close to a stoichiometric composition, the mixed amounts of the starting materials are to be adjusted in consideration of the amount of $Al_2O_3$ of first oxide 2 formed on the surface of soft-magnetic metal powder 1. Furthermore, a size of first recess 4 formed in the surface of first oxide 2 and a size of second recess 5 formed in the surface of soft-magnetic metal powder 1 can be adjusted by adjusting the temperature, the time, and the atmosphere of the heat treatment in step 4. When the mixed amount of the $Al_2O_3$ powders is less than that of the $Fe_2O_3$ powders to be mixed as the starting powders, $Fe_2O_3$ reacts with $Al_2O_3$ (first oxide 2), and as a result, stable $FeAl_2O_4$ (second oxide 3) can be obtained.

Furthermore, the $Fe_2O_3$ powders and the $Al_2O_3$ powders are used as the starting materials to form second oxide 3 in the present disclosure, but the method for manufacturing composite magnetic material 100 in this exemplary embodiment is not limited to this, and oxides to form second oxide 3 may be previously mixed and ground to be used.

Variation 1 of Second Exemplary Embodiment

Figure 9:
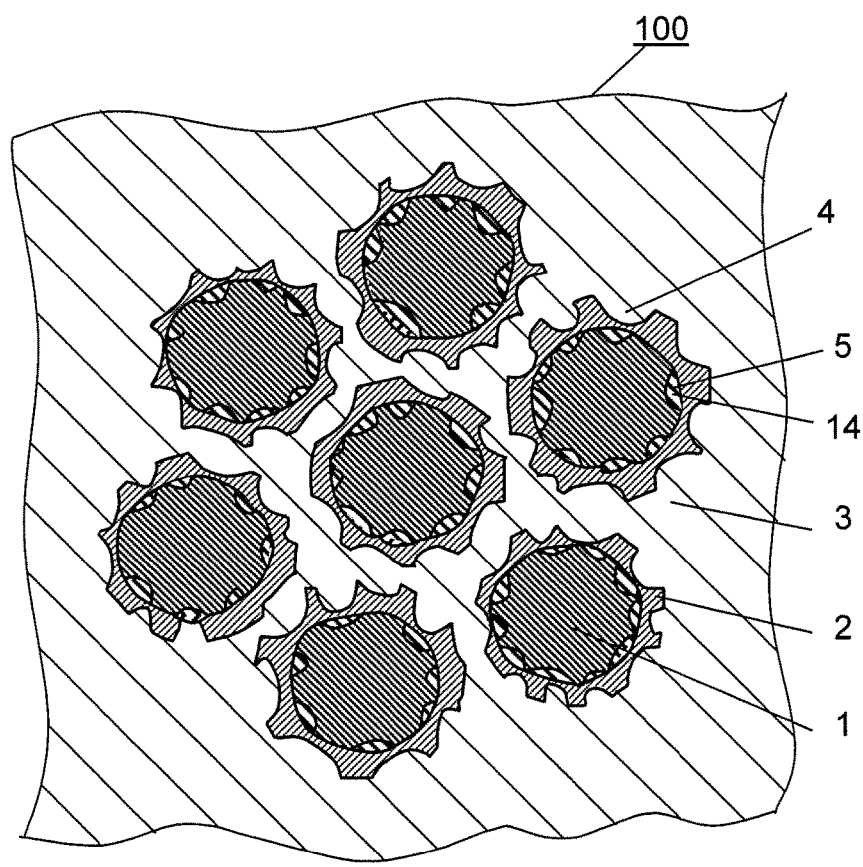
FIG. 9 is a schematic view showing a cross-sectional view of a composite magnetic material in Variation 1 of the second exemplary embodiment.

FIG. 9 shows composite magnetic material 100 in Variation 1 of the second exemplary embodiment in the present disclosure. As shown in FIG. 9, second recess 5 is formed when soft-magnetic metal powder 1 is internally oxidized, and by controlling an oxygen partial pressure in a heat treatment atmosphere, third oxide 14 is formed separately from first oxide 2 is formed.

According to composite magnetic material 100 in Variation 1, as one example, when soft-magnetic metal powders 1 are composed of Fe—Si—Al based alloy, third oxide 14 is $SiO_2$. Thus, when third oxide 14 is formed separately from first oxide 2, an internal stress is increased, so that large second recess 5 is formed. As a result, adhesion force can be further improved.

Variation 2 of Second Exemplary Embodiment

Figure 10:
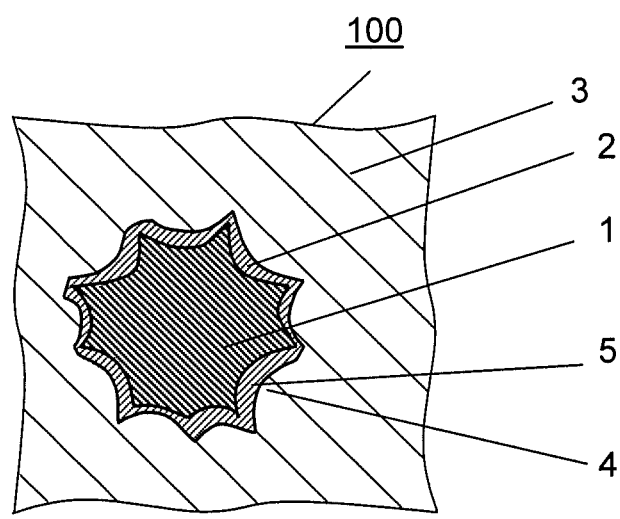
FIG. 10 is a schematic view showing a cross-sectional view of a composite magnetic material in Variation 2 of the second exemplary embodiment.

FIG. 10 is a view showing Variation 2 of the second exemplary embodiment.

As shown in FIG. 10, according to composite magnetic material 100 in the present disclosure, first recess 4 is provided in second recess 5.

For example, a structure shown in FIG. 10 can be formed by a rapidly heat-up heat treatment such as discharge plasma sintering. In this structure, a volume of second oxide 3 can be increased, so that magnetic characteristics can be improved.

Second oxide 3 in composite magnetic material 100 in the present disclosure may be various kinds of ferrite materials. Representative materials include Mn—Zn series, Ni—Zn series, Mg—Zn series, and a magnetic sintered spinel structure body provided by mixing various elements to hercynite.

The present disclosure relates to a composite magnetic material superior in magnetic characteristics and high in mechanical strength, and a coil component using same, and a power supply device. The present disclosure is particularly useful for an inductor component to be used in a vehicle.

What is claimed is:

1. A composite magnetic material comprising:
    a plurality of soft-magnetic metal powders;
    a first oxide covering a portion of a first surface of each of the plurality of soft-magnetic metal powders, the first oxide includes a surface having a first recess; and
    a second oxide covering a surface of the first oxide,
    wherein the second oxide fills voids between the plurality of soft-magnetic metal powders each coated with the first oxide including the first recess,
    a portion of the first surface of the plurality of soft-magnetic metal powders is in contact with second oxide, and wherein an area ratio A/B is between 0.25 and 4, where A represents a contact area between the first oxide and each of the plurality of soft-magnetic metal powders, and B represents a contact area between the second oxide and each of the plurality of soft-magnetic metal powders.

2. The composite magnetic material according to claim 1, wherein
    each of the plurality of soft-magnetic metal powders has a second recess in a surface.

3. The composite magnetic material according to claim 2, wherein
    a third oxide is formed in the second recess.

4. The composite magnetic material according to claim 2, wherein
    at least one element contained in the plurality of soft-magnetic metal powders is a first element,
    at least one element contained in the first oxide is the first element,
    at least one element contained in the second oxide is the first element, and
    the first element is one of Al, Cr, Ti, Mg, Ni, Si and Ca.

5. The composite magnetic material according to claim 2, wherein
    the second oxide is a ferrite material.

6. The composite magnetic material according to claim 1, wherein
    at least one element contained in the plurality of soft-magnetic metal powders is a first element,
    at least one element contained in the first oxide is the first element,
    at least one element contained in the second oxide is the first element, and
    the first element is one of Al, Cr, Ti, Mg, Ni, Si and Ca.

7. The composite magnetic material according to claim 6 satisfies a relationship of L<N<M,
    where L represents a concentration of the first element contained in the plurality of soft-magnetic metal powders,
    M represents a concentration of the first element contained in the first oxide, and
    N represents a concentration of the first element contained in the second oxide.

8. The composite magnetic material according to claim 6, wherein
    a concentration of the first element has a gradient distribution in a layer near an interface between each of the plurality of soft-magnetic metal powders and the first oxide in a direction vertical to the interface, and
    a concentration of the first element has a gradient distribution in a layer near an interface between the first oxide and the second oxide in a direction vertical to the interface.

9. The composite magnetic material according to claim 1, wherein
    the second oxide is a ferrite material.

10. The composite magnetic material according to claim 1, wherein
    the first oxide is a ferrite material.

11. The composite magnetic material according to claim 1, wherein
    an average thickness of the first oxide from the surface of each of the plurality of soft-magnetic metal powders falls in a range from 5 nm to 500 nm inclusive.

12. The composite magnetic material according to claim 1, wherein
    the plurality of soft-magnetic metal powders are Fe—Si—Al based alloy,
    the first oxide is $Al_2O_3$, and
    the second oxide includes $FeAl_2O_4$.

13. A coil component including the composite magnetic material according to claim 1, in a winding portion of a wound coil.

14. A power supply device comprising:
    a switching element;
    a drive circuit for controlling a switching operation of the switching element; and
    the coil component according to claim 13 and connected to the switching element.

* * * * *